Nov. 21, 1961 E. HONORÉ ET AL 3,009,640

IMPROVEMENTS IN ANALOG COMPUTER CIRCUIT

Filed Jan. 16, 1958 6 Sheets-Sheet 2

Nov. 21, 1961 E. HONORÉ ET AL 3,009,640

IMPROVEMENTS IN ANALOG COMPUTER CIRCUIT

Filed Jan. 16, 1958 6 Sheets-Sheet 4

IMPROVEMENTS IN ANALOG COMPUTER CIRCUIT

3,009,640
IMPROVEMENTS IN ANALOG COMPUTER CIRCUIT

Etienne Honoré and Emile Torcheux, Paris, France, assignors to Compagnie Generale de Telegraphie sans Fil, a corporation of France, and Societe Marocaine de Recherches, d'Etudes et de Developpements "Somarede," a corporation of Morocco Filed Jan. 16, 1958, Ser. No. 709,388
Claims priority, application France Jan. 21, 1957
10 Claims. (Cl. 235—193)

The present invention relates to electronic analog computers, i.e. to computers in which magnitudes to be computed are represented by electric magnitudes. Thus one volt may, for instance, represent one kilometer.

The invention provides an electric computer circuit adapted to carry out elementary arithmetical operations with a great accuracy. Broadly, this computer circuit is capable of resolving any equation of the form:

$$V_1X_1+ \dots V_NX_N=0$$

wherein $V_1$ to $V_N$ are fixed magnitudes and $X_1$ to $X_N$ variable magnitudes.

An electric circuit according to the invention comprises at least two quadripoles, each having two input and two output terminals, the two output terminals of the first quadripole being respectively connected to the input terminal of the second quadripoles, the input and the output terminals in each quadripole being connected by resistive admittances, the sum of the admittances comprised in a quadripole being equal to zero when the input or the output terminals of the quadripole are shorted. These admittances are preferably provided by positive and negative resistances.

According to one embodiment of the invention, one input and one output terminal of each quadripole are grounded, the quadripole thus becoming in fact a tripole, the remaining terminals being connected together by a resistive admittance and being connected to ground by resistive admittances of a sign opposite to that of the admittance which connects them to each other.

According to a further embodiment, the circuit of the invention includes at least two quadripoles wherein the input terminals are connected to the output terminals, respectively, by equal resistive admittances, two input and two output terminals being respectively inter-connected by admittances having a sign opposite to that of the above admittance and an absolute value equal to twice the absolute value thereof.

An energy supply and a load are respectively coupled to the free input and output terminals of the circuit comprising at least two quadripoles.

The invention will be better understood from the following description taken in connection with the accompanying drawing, wherein.

Figure 5:
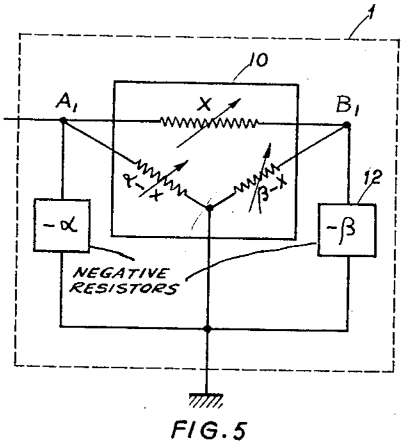
Figure 7:
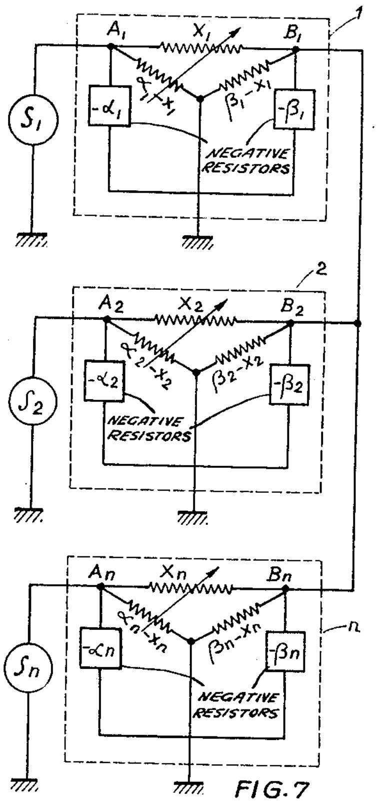
Figure 8:
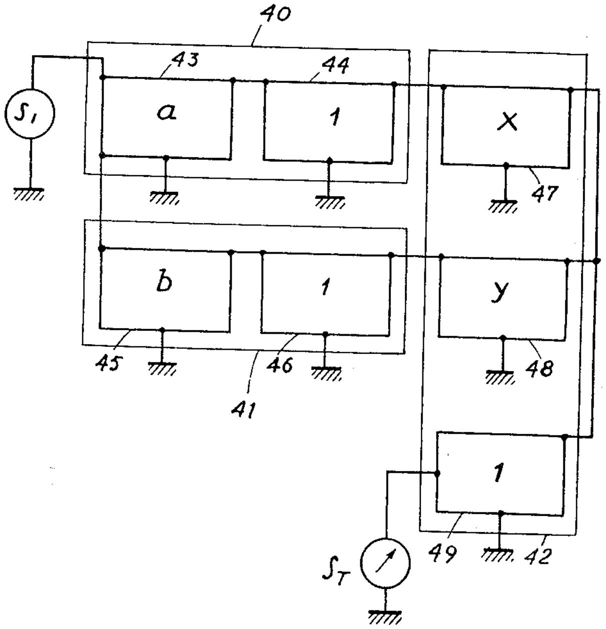
Figure 10:
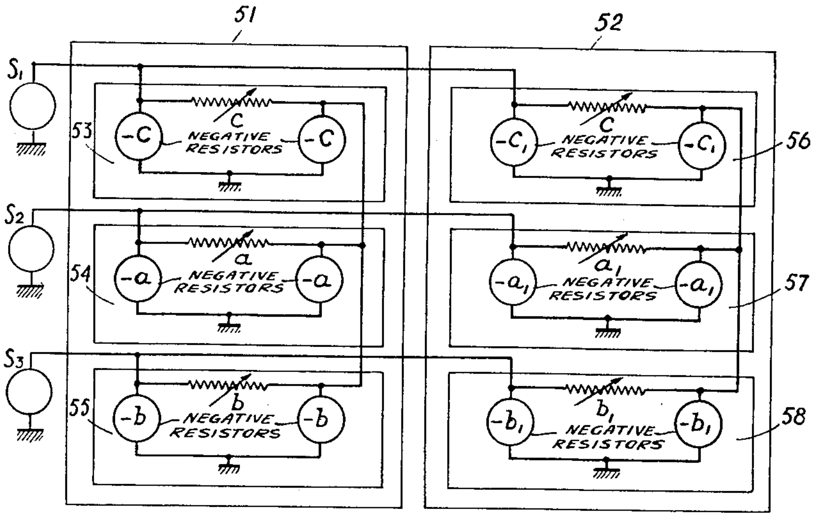
Figure 6:
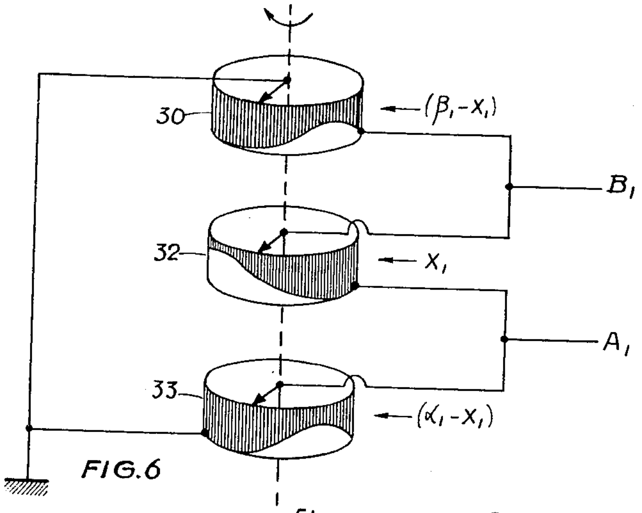
Figure 9:
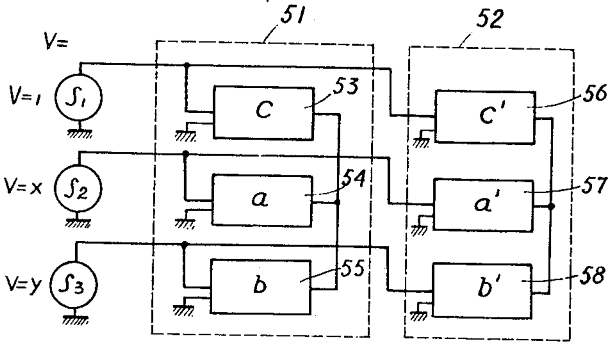
Figures 11, 12:
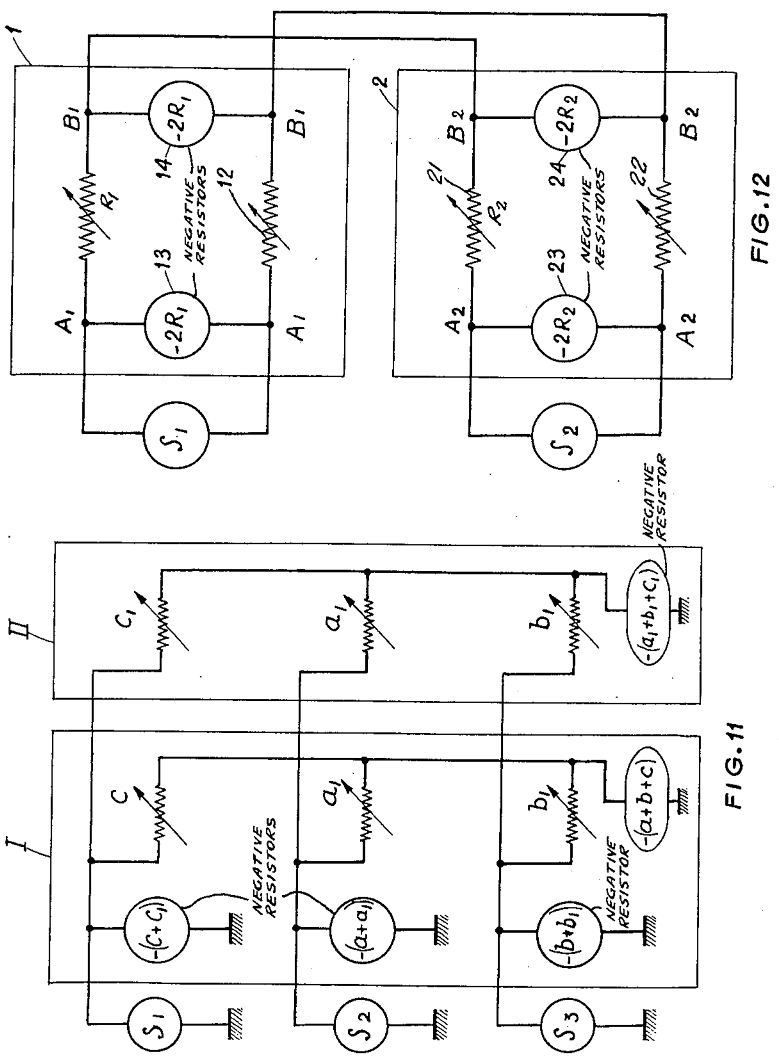
Figure 13:
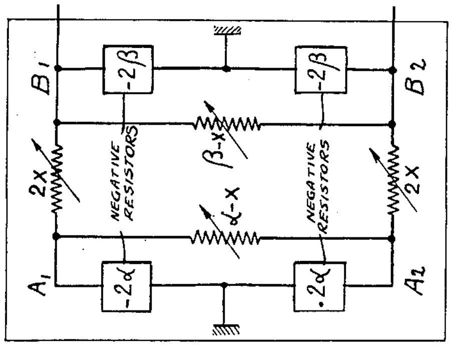

FIG. 5 very diagrammatically shows a quadripole used in the circuit according to another embodiment of the invention;

FIG. 6 shows an embodiment of the rheostat used in FIG. 5;

FIG. 7 shows a circuit according to the invention and comprising quadripoles of FIG. 5;

FIGS. 8, 9 and 10 show different computer circuits according to the invention;

FIG. 11 shows a simplification of the circuit of FIG. 10;

FIG. 12 shows a circuit according to the invention and comprising quadripoles of a modified type;

FIG. 13 shows a variation of the quadripole used in FIG. 12;

FIGS. 14, 15, 16 and 17 show different computer circuits of the invention based on the circuits of FIGS. 12 and 13.

Figure 1:
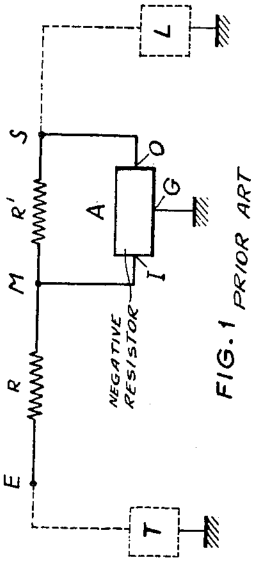
FIG. 1 PRIOR ART
FIG. 1 shows a calculator circuit of a known type.

The circuit according to the prior art shown in FIG. 1 comprises a resistance R connected between a terminal E and a terminal M and a resistance R' connected between terminal M and a terminal S. An amplifier A, having preferably a very high gain and a high input impedance, has its input terminal I connected to terminal M, is grounded at G and has an output terminal S. A voltage supply source T and a load L, are connected between ground and points E and S respectively. The arrangement operates as follows: a feedback is produced on amplifier A in such a manner that the voltage at terminal M is substantially nil and the intensity of the current between terminals M and I is also substantially nil.

Applying Kirchhoff's law at terminal M, the following relation is obtained for the respective voltages $V_1$ and $V_2$ at the terminals E and S:

$$\frac{V_1}{R}+\frac{V_2}{R'}=0$$

or $$V_2=-\frac{V_1R}{R'}$$

Figure 2:
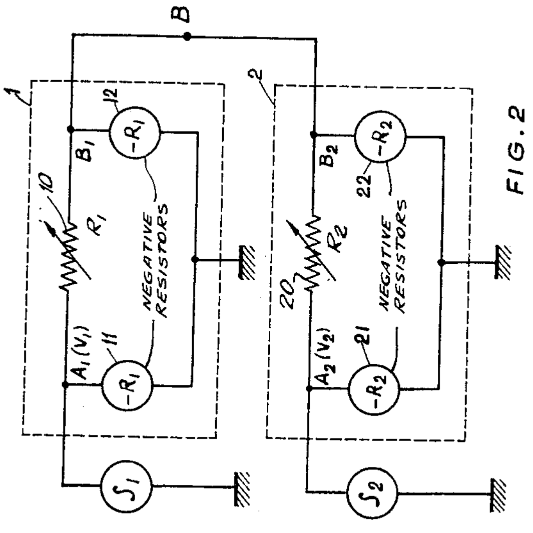
FIG. 2 illustrates a diagram of a computer according to the invention.

This arrangement thus allows the effecting of a multiplication. However, theory and experience show that the operation is not very accurate. Moreover, the arrangement is not reversible. FIG. 2 schematically illustrates a computer circuit provided by the invention and adapted to effect the same operations as the circuit in FIG. 1. This circuit comprises two quadripoles 1 and 2 with one of their respective input terminals and one of their respective output terminals grounded. Terminals $A_1$ and $B_1$ of quadripole 1 are connected by a purely resistive impedance 10 or $R_1$ ohms whose admittance is $$X=\frac{1}{R_1}$$

and is called the characteristic admittance of the quadripole. Points $A_1$ and $B_1$ are grounded through purely resistive impedances 11 and 12, respectively, both having the value $-R_1$.

In a similar way, in quadripole 2, an impedance 20, of value $R_2$ and admittance $$X_2=\frac{1}{R_2}$$

connects terminals $A_2$ and $B_2$ which are both grounded through resistance impedances 21 and 22 of value $-R_2$. Terminals $B_1$ and $B_2$ are connected to a common terminal B.

A source $S_1$ is coupled to terminal $A_1$ and a load $S_2$ of very high resistance to terminal $A_2$.

The circuit operates as follows: $V_1$, $V_2$ and $V_3$ being the respective potentials at terminals $A_1$, $A_2$ and B, applying the Kirchhoff's law at point B, the following relation is obtained:

$$X_1(V_3-V_1)-X_1V_3+X_2(V_3-V_2)-X_2V_3=0$$

which gives:

$$V_1X_1+V_2X_2=0 \qquad (1)$$

$$V_2=-\frac{X_1}{X_2}V_1 \qquad (2)$$

The cell thus established is therefore able to resolve the same problem as that of FIG. 1. The circuit according to the invention displays, in addition to being reversible, the advantage that errors due to the fact that the resistances used are neither perfectly stable nor perfectly adjusted, that the load $S_2$ does not have an infinite resistance or, broadly speaking, that the theoretical conditions are not accurately fulfilled, intervene only in the second order in relation (2).

Figure 3:
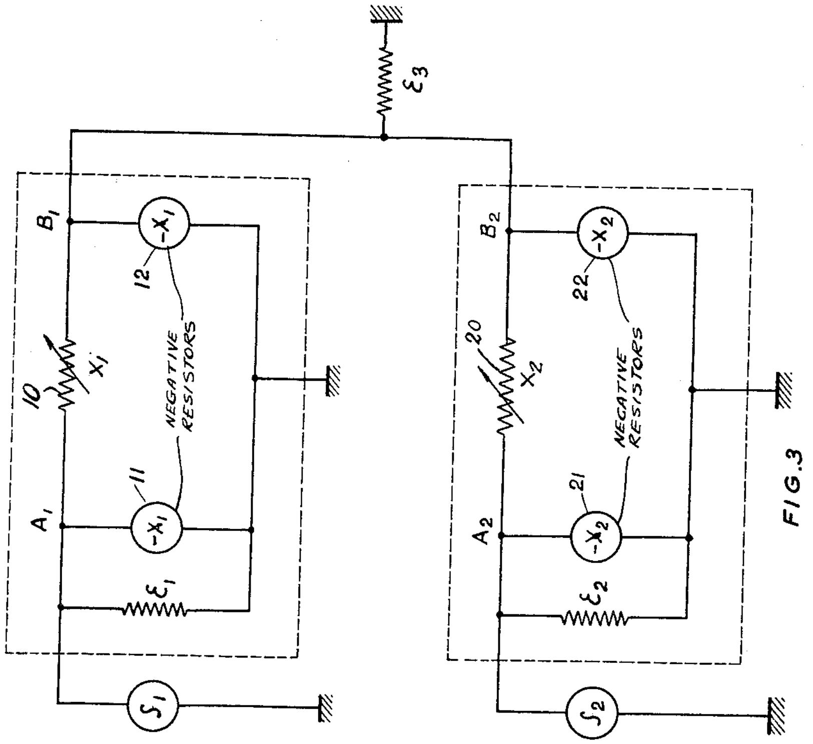
FIG. 3 is an explanatory diagram relating to FIG. 2.

Assuming that, in order to take into account the above inaccuracies, low admittance shunts $\epsilon_1$, $\epsilon_2$ and $\epsilon_3$ are present in the circuit as shown in FIG. 3, the following Equations 3 and 4 are obtained when applying Kirchhoff's law to points $A_2$ and $B_2$:

$$-X_2V_3+\epsilon_2V_2=0 \quad (3)$$

$$-X_1V_1+\epsilon_3V_3-X_2V_2=0 \quad (4)$$

wherefrom the value of $V_2$ is obtained:

$$V_2=-V_1\frac{X_1}{X_2}\cdot\frac{1}{1-\epsilon_2\frac{\epsilon_3}{X_2^2}} \quad (5)$$

This confirms the above statement.

Figure 4:
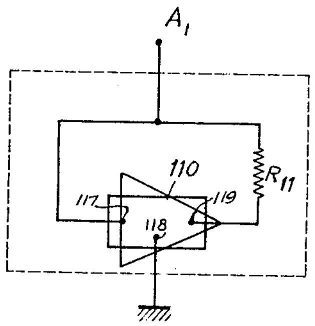
FIG. 4 illustrates a negative resistance used in a circuit according to the invention.

FIG. 4 shows a negative resistance which may be used in an arrangement according to the invention. It comprises an amplifier 110, having an input terminal 117, directly connected to terminal $A_1$ for instance, an output terminal 119 with a load $R_{11}$, connected between this terminal and terminal $A_1$ and a grounded connection 118. As is well known, the resistance equivalent to this arrangement is:

$$-R=\frac{R_{11}}{g} \quad (6)$$

It is thus possible, in order to obtain a predetermined value of R, to use either an adjustable resistance $R_{11}$ or an amplifier 110 with adjustable gain.

FIG. 5 illustrates schematically a circuit according to another embodiment of the invention with adjustable admittances X. Only one quadripole is shown, and it comprises a delta arrangement having its respective terminals connected to $A_1$, $B_1$ and to ground.

The three branches of the arrangement are respectively constituted by three resistances with respective admittances $X$, $\alpha-X$, and $\beta-X$, coupled as shown in the figure. Negative admittances obtained, for instance, according to the apparatus illustrated in FIG. 4, have the respective value $-\alpha$ and $-\beta$. The sum of the admittances at point $A_1$ is thus equal to $\alpha-X+X-\alpha=0$ and at point $B_1$ to $\beta-X+X-\beta=0$. Thus, this circuit is equivalent to that of FIG. 2 and the admittance is negative between terminal $A_1$ and ground, being equal to $-\alpha+\alpha-X=-X$, while the admittance between terminals $A_1$ and $B_1$ is equal to X.

FIG. 6 illustrates an arrangement of admittances $X_1$, $\alpha-X_1$ and $\beta-X_1$. This device comprises three rheostats 30, 32 and 33, the respective brushes of which are clamped on the same shaft. These rheostats are wound in such a manner that the admittances comprised between the brushes and the fixed terminals, respectively, are:

For rheostat 30 equal to $\beta_1-X_1$
For rheostat 32 equal to $X_1$
For rheostat 33 equal to $\alpha_1-X_1$ $X_1$ being a linear function of the angular position of the shaft.

The brush of rheostat 30 is grounded, and its winding connected to terminal $\beta_1$.

The brush of rheostat 31 is connected to terminal $\beta_1$ and its fixed terminal to terminal $A_1$.

The brush of rheostat 33 is connected to terminal $A_1$ and its fixed terminal is grounded.

FIG. 7 very diagrammatically shows a circuit according to the invention including $n$ quadripoles 1 to $n$, with $n>2$, the arrangement being similar to the quadripole of FIG. 5.

They comprise respectively terminals $A_1, A_2 \ldots A_n$, connected respectively, to terminals $B_1 \ldots B_n$ by means of a delta connection comprising respectively the admittances:

$$X_1,\ \alpha_1-X_1,\ \beta_1-X_1$$
$$X_2,\ \alpha_2-X_2,\ \beta_2-X_2$$
$$\ldots\ldots\ldots\ldots\ldots\ldots$$
$$X_n,\ \alpha_n-X_n,\ \beta_n-X_n$$

Terminals $B_1, B_2 \ldots B_n$ are connected together.

The potentials of terminals $A_1, A_2 \ldots A_n$ being respectively, $V_1 \ldots V_n$ and these terminals being grounded by devices $S_1 \ldots S_n$, which may be either loads or power supplies, the following relation may thus be readily established:

$$V_1X_1+V_2X_2+\ \ldots\ V_nX_n=0 \quad (7)$$

In this equation, $X_1$, $X_2$, $X_n$ may represent data which are inserted into the circuit by the adjustment of the delta connections; voltages $V_1 \ldots V_n$ are either data obtained by adjusting the potential supplies or the results.

On the whole, it may be said of the computer circuit of the invention that, while its structure is entirely different from the computer described in the United States Patent 2,785,853 of March 19, 1957, the equations and results provided are entirely similar to those obtained through the computer of the above patent, the quadripoles being associated in the same way in both cases.

Some examples of the circuits which can thus be obtained will now be described by way of example.

FIG. 8 diagrammatically shows a computer according to the invention capable of solving the equation $$Z=aX+bY \quad (8)$$

This computer comprises three networks 40, 41 and 42. Network 40 comprises two quadripoles 43 and 44, the characteristic admittances of which are $a$ and 1, respectively. Network 41 comprises two quadripoles 45 and 46 whose characteristic admittances are, respectively, $b$ and 1. The inputs of quadripoles 43 and 45 are fed by a common source $S_1$ of potential V which is taken as a unity.

Potentials $a$ and $b$ are obtained across the respective outputs of networks 40 and 41 in accordance with Equation 8. These potentials are fed to the input terminals of quadripoles 47 and 48 of a network 42 further comprising a quadripole 49. Respective characteristic admittances of quadripoles 47, 48 and 49 are X, Y and 1, respectively.

The potential Z at the output of quadripole 49 is equal to $aX+bY$ and it may be noted that, when separate computer networks are put in parallel in which case they may have a common quadripole, there is addition.

FIG. 9 illustrates, by way of a further example, a computer circuit capable of solving the equation system:

$$aX+bY+C=0$$
$$a'X+b'Y+C'=0$$

The computer circuit shown in this figure comprises networks 51 and 52, comprising respectively three quadripoles 53, 54, 55 and 56, 57, 58. The characteristic admittances of these quadripoles are respectively $c$, $a$, $b$, $c'$, $a'$, $b'$.

Quadripoles 53 and 56 are fed in parallel by a grounded supply source $S_1$ whose potential is taken as unity. The data $a$, $b$, $c$, $a'$, $b'$, $c'$, are displayed by the respective characteristic admittances of the quadripoles. Two meters $S_2$ and $S_3$ indicate potential X and Y, which are the solutions of the above equations. It can be shown that Equation 1 gives:

For network 51

$$aX+bY+c=0$$

and for network 52

$$a'X+b'Y+c=0$$

Consequently, the respective voltages X and Y, appearing at the respective terminals of meters $S_1$, and $S_2$ are the roots X and Y of this system of equations.

FIG. 10 shows the circuit of FIG. 9 in greater detail

The same references have been used in both figures. The individual quadripoles in FIG. 10 are shown in the same way as in FIG. 1.

Considering, for instance, quadripoles 53 and 56, it is readily seen that, since input admittances $-C$ and $-C_1$ are connected in parallel between source $S_1$ and ground, a single admittance $-(C+C_1)$ may be substituted for both. The same is true for input admittances $-a$ and $-a_1$ in quadripoles 54 and 57, and for input admittances $-b$ and $-b_1$ in quadripoles 55 and 58. On the other hand, admittances $-c$, $-a$ and $-b$, in quadripoles 53, 54 and 55 are in parallel. Consequently, a single admittance $-(a+b+c)$ may be substituted for all three of them. The same is true for quadripoles 56, 57 and 58. This has been done in FIG. 11.

FIG. 12 shows another calculator circuit according another embodiment of the invention. It is similar to the circuit of FIG. 2 and similar references have been used in both figures for similar elements, the description of which need not be repeated. In each quadripole, input terminals and output terminals are connected together by negative resistances, resjectively, 13, 23 and 14, 24 equal to $-2R_1$ in one quadripole and $-2R_2$ in the other. Terminals $B_1$ and $B_2$ are connected by pairs.

It is readily seen that the circuit of FIG. 12 is similar to that of FIG. 2 except that the resistances inserted between the terminals and ground in FIG. 2 are not grounded in FIG. 12 and the value of these resistances is twice as great.

If the input or the output terminals of such a quadripole are short circuited, the sum of the remaining resistance is nil. $R_1$ and $R_2$ are respectively the characteristic admittances of the two quadripoles.

It is readily seen that the same relation prevails between voltages $V_1$ and $V_2$ as in the case of FIG. 2 and that the degree of accuracy is the same.

Negative resistances 13, 14 and 23, 24 may be realized according to the diagram shown in FIG. 4.

FIG. 13 shows a quadripole of the circuit of FIG. 12 comprising adjustable admittances. This quadripole comprises two fixed negative admittances connected in series between terminals $A_1$ and $A_2$ and having the value $-2\alpha$, and two fixed negative admittances of value $-2\beta$ connected in series between $B_1$ and $B_2$. These negative admittances are respectively shunted by two adjustable positive admittances of respective values $\alpha-X$ and $\beta-X$. Terminals $A_1$, $A_2$ and $B_1$, $B_2$ are respectively connected through two positive adjustable admittances equal to 2X. This quadripole is entirely similar to that of FIG. 5. If terminals $B_1$ and $B_2$ are shorted, the sum of the remaining admittances is $-\alpha+\alpha-X+X=0$.

Figure 14:
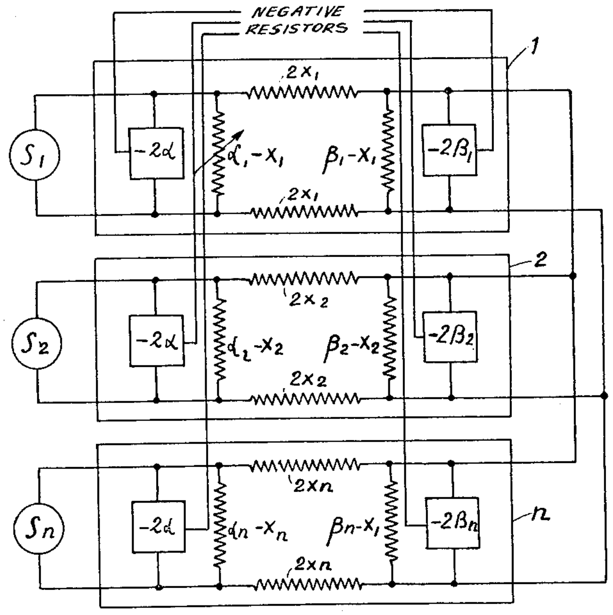

FIG. 14 illustrates a calculator network having $n$ elements and equivalent to that shown in FIG. 7, the latter being built from quadripoles shown in FIG. 5 while the former comprises quadripoles shown in FIG. 13. Both circuits operate in an identical manner and the same reference numerals have been used in both. The only difference is that each quadripole, instead of having one input and one output terminal grounded, has two input terminals and two output terminals, two terminals of each quadripole 1, 2, 3 being connected in parallel with two terminals of the remaining quadripoles. Of course, the supply source or sources and the load or loads are also each coupled to two quadripole terminals instead of one terminal and ground.

Figure 15:
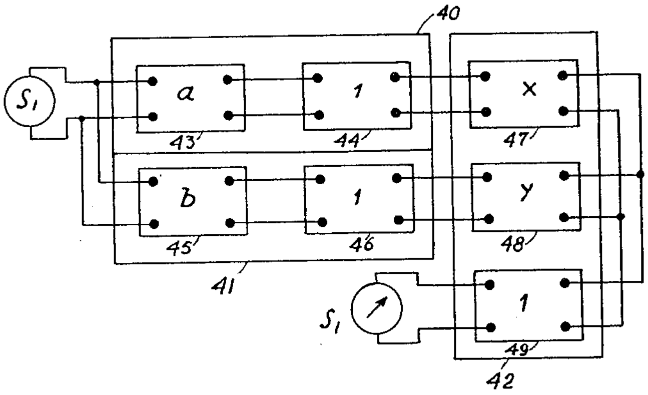

In the same way, FIG. 15 shows a computer circuit exactly corresponding to the circuit of FIG. 8. The same reference numerals are used in both figures and the description of FIG. 8 and the explanation of the operation of the circuit shown therein applies to FIG. 15.

Figure 16:
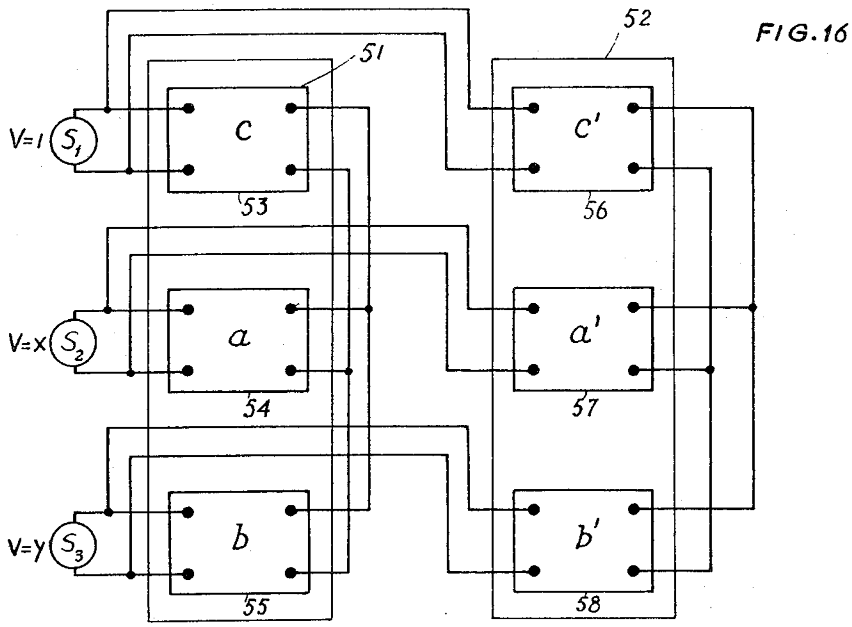

In the same way, FIG. 16 shows a computer circuit equivalent to that of FIG. 9 and in which quadripoles as shown in FIG. 12 or 13 have been used instead of grounded quadripoles or tripoles such as those of FIG. 2. The same references have been used in FIG. 9 and in FIG. 16. The operation is of course exactly the same in both cases.

Figure 17:
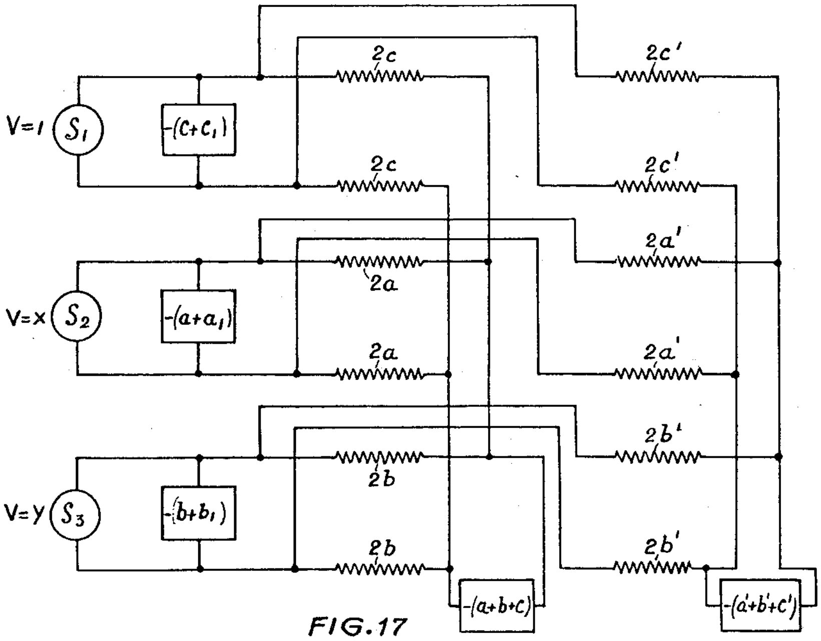

FIG. 17 corresponds to FIG. 16 in the same way as FIG. 11 corresponds to FIG. 10. This is to say that admittances $-(c+c_1)$, $-(a+a_1)$, $-(b+b_1)$, $(a+b+c)$ or $-(a+b_1+c_1)$, as the case may be, have been substituted for admittances in parallel. The operation is entirely the same in both cases.

More generally, it may be said that quadripoles or grounded quadripoles, i.e. tripoles, may be interchangeably used in the computer circuits according to the invention.

What we claim is:

1. An electric analog computer circuit, adapted to carry out elementary arithmetical operations, comprising at least two quadripoles, each having one pair of input terminals and one pair of output terminals, the output terminals of one quadripole being respectively directly connected to the input terminals of the other quadripole, and positive and negative conductive admittances interconnecting in each quadripole the input terminals and the output terminals, means for varying at least one of said admittances, the sum of the admittances in each quadripole being equal to zero with one of said pairs of terminals shorted, means for feeding at said input terminals direct current voltage, means for collecting at said output terminals an output voltage.

2. An electric analog computer circuit, adapted to carry out elementary arithmetical operations, comprising at least two quadripoles, each having one pair of input terminals and one pair of output terminals, the output terminals of one quadripole being respectively directly connected to the input terminals of the other, in each quadripole adjustable resistors of the same admittance connecting respectively the input terminals to the output terminals, means for adjusting said resistors, and negative and positive admittances interconnecting the terminals of each pair, the sum of the admittances of each quadripole being equal to zero, with one of said pairs of terminals shorted, means for feeding at said input terminals direct current voltage, means for collecting at said output terminals an output voltage.

3. An electric analog computer circuit, adapted to carry out elementary arithmetical operations, comprising at least two quadripoles, each having one pair of input terminals and one pair of output terminals, the output terminals of one quadripole being respectively connected to the input terminals of the other, in each quadripole, resistors equal to R connecting respectively the input terminals to the output terminals and negative resistor equal to $-2R$ interconnecting respectively the terminals of each pair and means for varying said value R, means for feeding at said input terminals direct current voltage, means for collecting at said output terminals an output voltage.

4. An electric analog computer circuit, adapted to carry out elementary arithmetical operations, comprising two quadripoles, each having one pair of input terminals and one pair of output terminals, the output terminals of one quadripole being respectively directly connected to the input terminals of the other and, in each quadripole, first adjustable resistors of admittance equal to 2X respectively connecting the input terminals to the output terminals, a second adjustable resistor of adjustable admittance $\alpha-X$ and a negative admittance of a value equal to $-\alpha$, connected in parallel with said second adjustable resistor and connecting the two input terminals, a third adjustable resistor of adjustable admittance $\beta-X$ and a negative admittance of a value $-\beta$, connected in parallel with said third adjustable resistor and connecting the two output terminals, $\alpha$ and $\beta$ being constant and X having a predetermined value for each quadripole, means for feeding at said input terminals direct current voltage, means for collecting at said output terminals an output voltage.

5. An electric analog computer circuit, adapted to carry out elementary arithmetical operations, comprising at least two quadripoles, each having one pair of input terminals and one pair of output terminals, the output terminals of one quadripole being respectively directly connected to the input terminals of the other; in each quadripole, means for grounding the one input and one output, positive and negative conductive admittances connecting, in each quadripole, the other input terminal to the other output terminal and to ground, the sum of said admittances being equal to zero with one of said pairs of said terminals shorted, means for feeding at said input terminals direct current voltage, means for collecting at said output terminals an output voltage.

6. An electric analog computer circuit, adapted to carry out elementary arithmetical operations, comprising at least two quadripoles, each having one pair of input terminals and one pair of output terminals, the output terminals of one quadripole being respectively directly connected to the input terminals of the other quadripole, in each quadripole, means for grounding one input terminal and one output terminal, resistors connecting the other input terminal to the other output terminal, negative and positive admittances connecting respectively said other input and output terminals to ground and the sum of the admittances pertaining to each quadripole being equal to zero, with one of said pairs of terminals shorted, means for feeding at said input terminals direct current voltage, means for collecting at said output terminals an output voltage.

7. An electric analog computer circuit, adapted to carry out elementary arithmetical operations, comprising at least two tripoles each having one input terminal, one output terminal and a third grounded terminal, the output terminal of one tripole being respectively directly connected to the input terminal of the other, positive and negative conductive admittances interconnecting in each tripole the input terminal, the output terminal and the grounded terminal and the sum of said admittances being equal to zero, with one of said input and output terminals grounded, means for feeding between said input terminal and the ground an input direct current voltage, means for collecting between said output terminal and the ground an output direct current voltage.

8. An electric analog computer circuit, adapted to carry out elementary arithmetical operations, comprising at least two tripoles, each having one input terminal, one output terminal and a third grounded terminal, the output terminal of one tripole being directly connected to the input terminal of the other; in each tripole, a resistor connecting said input terminal to said output terminal and admittances, equal in absolute value to the admittance of said resistor but of opposite sign, connecting respectively said input terminal and said output terminal to ground, means for feeding between said input terminal and the ground an input direct current voltage, means for collecting between said output terminal and the ground an output direct current voltage.

9. An electric analog computer circuit, adapted to carry out elementary arithmetical operations, comprising at least two tripoles, each having one input terminal, one output terminal and a third grounded terminal, the output terminal of one tripole being directly connected to the input terminal of the other; in each tripole, a first resistor of adjustable admittance X connecting the input terminal to the output terminal, a second resistor of adjustable admittance $\alpha - X$ and an impedance of negative admittance connected in parallel between the input terminal and ground, and a third resistor of adjustable admittance $\beta - X$ and an impedance of negative admittance, parallel connected between the output terminal and ground, means for feeding between said input terminal and the ground an input direct current voltage, means for collecting between said output terminal and the ground an output direct current voltage.

10. An electric analog computer circuit as claimed in claim 9, further comprising three rheostats for respectively adjusting said first, second and third resistors and means for simultaneously controlling said rheostats.

References Cited in the file of this patent

UNITED STATES PATENTS

| | | |
|---|---|---|
| 1,969,836 | Dolmage | Aug. 14, 1934 |
| 2,137,696 | Mouradian | Nov. 22, 1938 |
| 2,785,853 | Honore | Mar. 19, 1957 |

OTHER REFERENCES

Communication Circuits (Ware et al.), 1949, pp. 37, 43, 44.